United States Patent [19]

Klovstad et al.

[11] Patent Number: 4,713,777
[45] Date of Patent: Dec. 15, 1987

[54] SPEECH RECOGNITION METHOD HAVING NOISE IMMUNITY

[75] Inventors: John W. Klovstad, Dorchester; Chin-Hui Lee, Cambridge; Kalyan Ganesan, Burlington, all of Mass.

[73] Assignee: Exxon Research and Engineering Company, Florham Park, N.J.

[21] Appl. No.: 593,892

[22] Filed: May 27, 1984

[51] Int. Cl.$^4$ .............................................. G10L 5/00
[52] U.S. Cl. ..................................... 364/513.5; 381/43
[58] Field of Search ...................................... 381/41–43; 364/513, 513.5

[56] References Cited

U.S. PATENT DOCUMENTS

| | | | |
|---|---|---|---|
| 4,156,868 | 5/1979 | Levinson | 340/146.3 |
| 4,277,644 | 7/1981 | Levinson et al. | 381/43 |
| 4,336,421 | 6/1982 | Welch et al. | 381/43 |
| 4,426,551 | 1/1984 | Komatsu et al. | 381/41 |
| 4,481,593 | 11/1984 | Bahlor | 381/43 |
| 4,587,670 | 5/1986 | Levinson et al. | 381/43 |
| 4,592,085 | 5/1986 | Watari et al. | 381/43 |

FOREIGN PATENT DOCUMENTS

| | | |
|---|---|---|
| 0108354 | 5/1984 | European Pat. Off. . |
| 3043516 | 9/1981 | Fed. Rep. of Germany . |
| 2107100A | 4/1983 | United Kingdom . |

OTHER PUBLICATIONS

Comptes Rendus Hebdomadaires Des Seance De L'Academie Des Sciences, vol. 273, No. 10, Serie A, Sep. 6, 1971, pp. 415–418, Paris, France; J. P. Haton et al., "Informatique Extraction de Parametres et Compression de L'Information Application a la Reconnaissance de la Parole".

IEEE Transactions on Acoustics, Speech and Signal Processing, vol. ASSP-23, No. 1, Feb. 1975, pp. 67–72, IEEE, New York, U.S.; F. Itakura, "Minimum Prediction Residual Principle Applied to Speech Recognition".

5th International Conference on Pattern Recognition, vol. 1, Dec. 1–4, 1980, Florida, pp. 321–325, IEEE, New York; D. Dours et al., "Multiprocessor Architecture Adapted to the Parallel Treatment of a Continuous Flow of Data".

ICASSP 81, Proceedings of the IEEE International Conference on Acoustics, Speech and Signal Processing, vol. 3, Mar. 30-Apr. 1, 1981, Atlanta, Ga., pp. 1176–1179, IEEE, New York, U.S.; E. C. Bronson et al., "A Parallel Architecture for Speech Understanding".

ICASSP 82, Proceedings of the IEEE International Conference on Acoustics, Speech and Signal Processing, vol. 3, May 3–5, 1982, Paris, France, pp. 1629–1632, IEEE, New York, U.S.; P. F. Brown et al., "Partial Traceback and Dynamic Programming".

ICASSP 82, Proceedings of the IEEE International Conference on Acoustics, Speech and Signal Processing, vol. 2, May 3–5, 1982, Paris, France, pp. 903–906, IEEE, New York, U.S.; C. Vicenzi et al., "Multiprocessor Architecture for Real-Time Speech Recognition Systems".

Primary Examiner—E. S. Matt Kemeny
Attorney, Agent, or Firm—Hale and Dorr

[57] ABSTRACT

In a speech recognition system, the beginning of speech versus non-speech (a cough or noise) is distinguished by reverting to a non-speech decision process whenever the liklihood cost of template (vocabulary) patterns, including silence, is worse than a predetermined threshold, established by a Joker Word which represents a non-vocabulary word score and path in the grammar graph.

7 Claims, 11 Drawing Figures

SPEECH RECOGNITION METHOD HAVING NOISE IMMUNITY

Appendix A is being submitted with the application for entry and availability in the application file, but for convenience, has not been submitted for publication. The appendix is available on microfiche. There are 5 microfiche and a total of 216 frames.

BACKGROUND OF THE INVENTION

The invention relates generally to the field of speech recognition and in particular to the recognition of speech elements in continuous speech.

The need for speech recognition equipment which is reliable and reasonably priced is well documented in the technical literature. Speech recognition equipment generally falls in two main categories. One category is speaker independent equipment wherein the speech recognition apparatus is designed to recognize elements of speech from any person. However speaker independent systems can be quite limited with regard to features other than the "speaker independence", for example, the number of words in the recognition vocabulary. Also, typically, five to ten percent of the population will not be recognized by such systems. The other category, speaker dependent speech recognition, relates to speech recognition apparatus which are substantially trained to recognize speech elements of a limited class, and in particular the class consisting of one person. Within each category, the speech recognition apparatus can be directed to the recognition of either continuous speech, that is, speech wherein the boundaries of the speech elements are not defined, or to isolated speech, that is, speech in which the boundaries of the speech elements are á priori known. An important difference between continuous and isolated speech recognition is that in continuous speech, the equipment must make complex "decisions" regarding the beginnings and ends of the speech elements being received. For isolated speech, as noted above, the incoming audio signal is isolated or bounded by either a given protocol or other external means which makes the boundary decisions relatively simple.

There exist today many commercial systems for recognizing speech. These systems operate in either a speaker independent environment (as exemplified for example by U.S. Pat. Nos. 4,038,503; 4,227,176; 4,228,498; and 4,241,329 assigned to the assignee of this invention) or in the speaker dependent environment. In addition, the commercially available equipment variously operate in either an isolated speech or a continuous speech environment.

The commercially available equipment, however, is expensive when high recognition performance is required. This is often a result of the best equipment being built for the most difficult problem, that is, speaker independent, continuous speech recognition. Consequently, many of the otherwise available applications to which speech recognition equipment could be adapted have not been considered because of the price/performance relationship of the equipment. Furthermore, the commercially available equipment cannot easily be expanded to provide added capability at a later date, and/or does not have the required accuracy or speed when operating outside of the laboratory environment.

Primary objects of the present invention are therefore an accurate, reliable, reasonably priced, continuous speech recognition method and apparatus which can operate outside of the laboratory environment and which enable the user to quickly and easily establish an operating relationship therewith. Other objects of the invention are a method and apparatus generally directed to speaker dependent, continuous speech recognition, and which have a low false alarm rate, high structural uniformity, easy training to a speaker, and real time operation.

SUMMARY OF THE INVENTION

The invention relates to a speech recognition apparatus and method in which speech units, for example words, are characterized by a sequence of template patterns. The speech apparatus includes circuitry for processing a speech input signal for repetitively deriving therefrom, at a frame repetition rate, a plurality of speech recognition acoustic parameters. The acoustic parameters thus represent the speech input signal for a frame time. The apparatus further has circuitry responsive to the acoustic parameters for generating likelihood costs between the acoustic parameters and the speech template patterns. The circuitry is further adapted for processing the likelihood costs for determining or recognizing the speech units of the speech input signal.

The invention features a method for inhibiting a response by the apparatus to non-vocabulary utterances in the speech input. The method features generating likelihood costs at each frame time for the acoustic parameters and template patterns, the template patterns including a pattern representing silence. If the cost for an active template pattern or acoustic kernel is better than a predetermined threshold value the system begins a normal speech recognition process. If the cost of the active template patterns, including the silence template pattern, are all worse than the predetermined threshold value the system reverts to a non-speech recognition process. If the silence template corresponds to the only likelihood cost which is better than the threshold value then the system remains in a quiescent state.

Further in accordance with the method, a second threshold value can be set and the apparatus will remain in the non-speech recognition process until a likelihood cost of the silence template is better than the second threshold. In specific embodiments, the two thresholds can be equal and various silence patterns can be selected to represent short and long silence.

DESCRIPTION OF A PREFERRED EMBODIMENT

AN OVERVIEW

Figure 1:
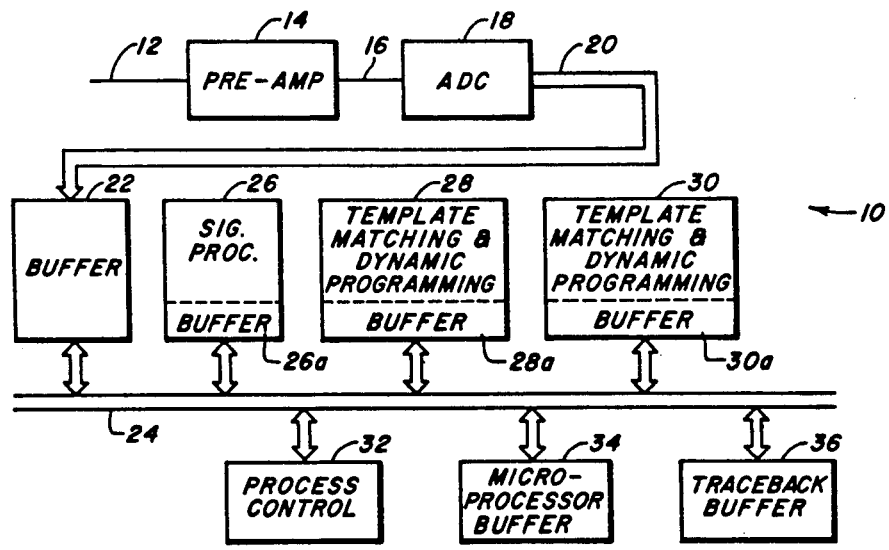
FIG. 1 is a schematic block diagram showing an overview of the speech recognition apparatus.
Figure 3:
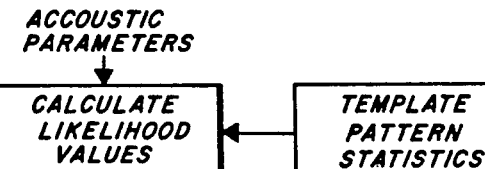
FIG. 3 is a detailed flow diagram of the dynamic programming and template matching portion according to the invention.

Referring to FIG. 1, a speech recognition apparatus 10 according to the invention receives an audio input over a line 12. The audio input is buffered and filtered by a preamplifier 14. The preamplifier 14 has an anti-aliasing filter and provides an output voltage over a line 16 which has the proper voltage values (that is, is normalized) for an analog-to-digital converter 18. In the illustrated embodiment, the analog-to-digital converter operates at a rate of 16,000, twelve bit conversions per second and provides the twelve bit output on lines 20. The twelve bit output of the analog-to-digital converter is directed to a buffer memory 22. The buffer 22 has a capacity for storing up to 320 samples or twenty milliseconds of speech. The minimum requirement is that buffer 22 be able to store slightly more than 160 samples.

The buffer 22 is connected to an internal data bus 24. The bus 24 acts as the primary data communications bus for the apparatus. The bus 24 thus interconnects buffer 22 with a signal processing circuitry 26, a first template matching and dynamic programming circuitry 28, a second template matching and dynamic programming circuitry 30, a process controlling circuitry 32, an acoustic parameter buffer memory 34, and a traceback buffer 36.

The recognition process is controlled by the process control circuitry 32 which incorporates, for example, a commercial microprocessor as the control element. The process control circuitry uses the memory 34 to enable the apparatus to operate with a variable processing rate. This means that the entire apparatus need not meet peak load demands in real time but only needs to operate in real time with respect to the average processing load. The hardware savings involved by employing this process configuration are substantial and are discussed in greater detail below.

Each of the circuitries 26, 28, and 30, in the illustrated embodiment, are structurally identical. They are modified by the software programs placed therein to perform either the audio signal processing of circuitry 26 or the template matching and dynamic programming of circuitries 28 and 30. This is discussed in more detail below. Each of the circuitries 26, 28, and 30 have therein a small 2,000 word memory 26a, 28a, and 30a respectively (sixteen bit words). These memories act as small "fast" buffers providing sufficient storage for continuous processing in the circuitries 26, 28, and 30. The apparatus 10 structure can be easily expanded along bus 24 by adding additional template matching and dynamic processing circuitries (such as circuitries 28 or 30) to process a larger recognition vocabulary. This expansion capability is a direct result of the chosen architecture which dictates that template matching and dynamic processing be executed on the same machine board, and in this particular embodiment by the use of identical circuitries for circuitries 28 and 30.

Figure 9:
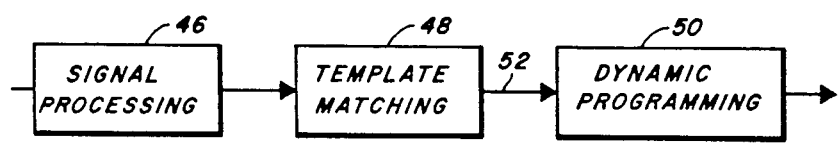
FIG. 9 is a diagrammatic block diagram of a prior art apparatus.

In the illustrated embodiment, each of the circuitries 26, 28, and 30 occupy one complete board of the assembly. While it would have been desirable to combine two of the data processing boards, the physical size of the combined board would not fit into the "rack", and hence in today's semiconductor technology, it was not feasible to combine the boards. The structure which has been developed, however, not only allows new boards to be added along bus 24 as described above, but reduces the data communications "log jam" that typically occurs in prior apparatus using separate template matching and dynamic programming circuitries (see for example FIG. 9 which shows a signal processing circuit 46 feeding a template matching circuit 48 and the template matching circuit 48 feeding a dynamic programming circuit 50). As a result of using separate template matching and dynamic programming circuitries, bandwidth problems invariably occur at the intrinsically high bandwidth connection 52 and must be solved. In the illustrated embodiment of the invention the apparatus structure allows for parallel processing on demand as described below, thereby reducing the bandwidth requirements along the bus, correspondingly decreasing the cost of the apparatus.

The speech recognition apparatus and method implemented by the illustrated embodiment processes the audio input over line 12, in the signal processing circuitry 26, to provide a set of acoustic parameters characterizing the input speech. It is these parameters which are stored in memory 34. The set of acoustic parameters can be thought of, in the illustrated embodiment, as a vector of sixteen eight-bit numbers or components. A new vector of acoustic parameters is generated each frame time, a frame time in the illustrated embodiment being ten milliseconds.

The acoustic parameters are called for, on demand, by the first and second template matching and dynamic programming circuitries. These circuitries, in general operation, compare each vector with prestored reference template patterns, only as needed, and generate likelihood statistics or costs representative of the degree of similarity. The previously stored reference template patterns characterize the speech elements to be recognized using the same processing methods employed in generating the acoustic parameters. Each speech elements, for example a word, is characterized by a sequence of template patterns as described in more detail below. A dynamic programming method is employed to generate a recognition decision, based upon the likelihood statistics or costs, in a manner which allows the apparatus to operate in real time.

The description below first describes how the acoustic parameters are generated. It then details the processing of the acoustic parameters, by circuitries 28 and 30, to obtain a recognition decision. It is important to note and appreciate that circuitries 28 and 30 are more than identical in structure; they operate in parallel in order to distribute the processing load and further enable real time operation.

Audio Signal Processing

Figure 2:
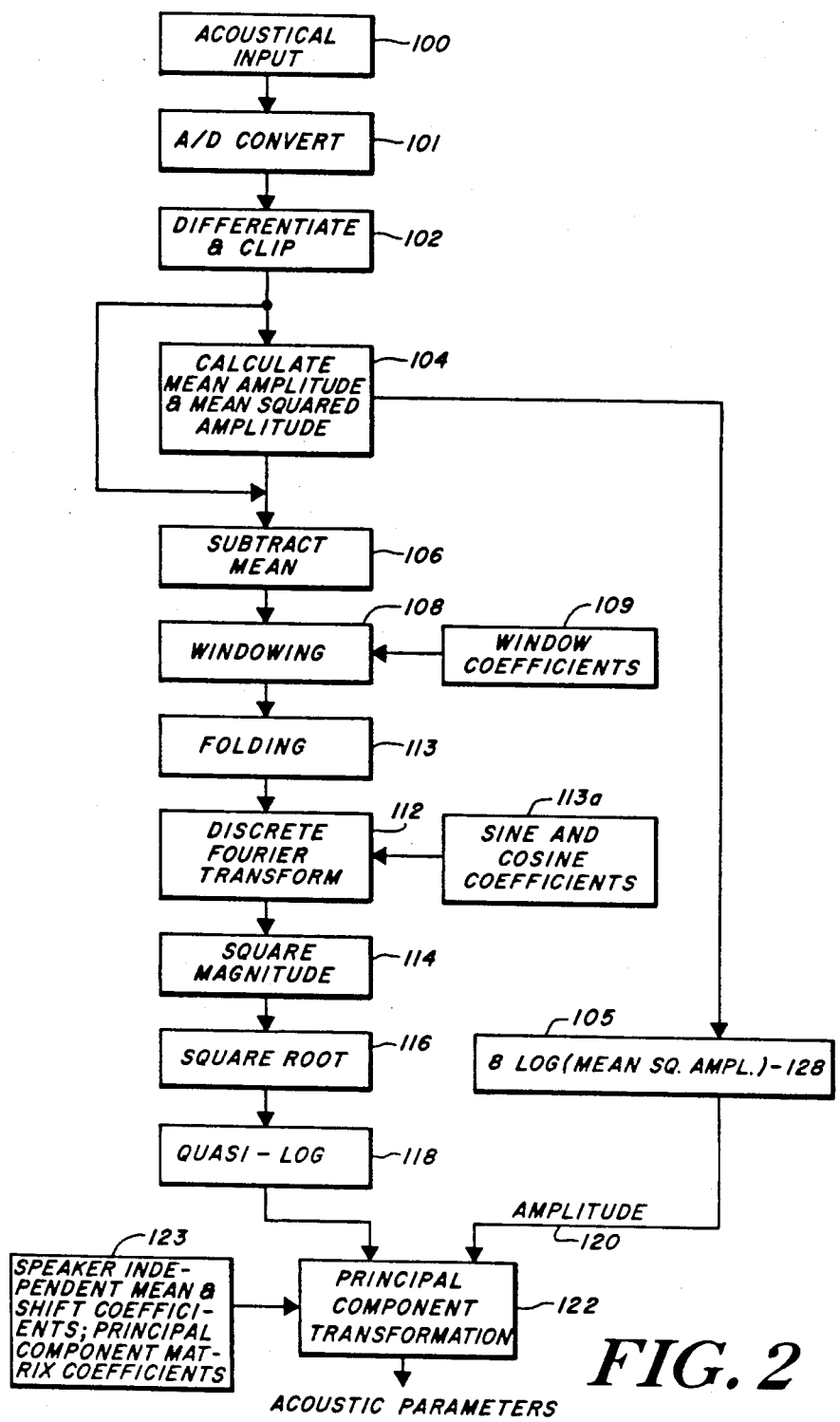
FIG. 2 is a schematic flow diagram of the signal processing portion of the illustrated embodiment of the invention.

Referring now to FIG. 2, an acoustical input 100 (over line 12 of FIG. 1) is passed at 101 to an A/D converter (18 in FIG. 1) after the necessary normalization and buffering (shown in FIG. 1 by preamplifier 14). The output of the A/D converter, after buffering by memory 22 (FIG. 1) is processed by the signal processing circuitry 26 as follows.

In the signal processing description that follows, the processed values of the data will often be clipped or normalized so that they fit into one eight bit byte. This is done so that a subsequent multiplication and/or accumulation does not produce any overflow beyond sixteen bits, and with respect to normalization to make best use of the available dynamic range.

The twelve bit output of the A/D converter is differentiated and clipped at 102. The input is differentiated by taking the negative first differences between successive input values. This occurs at the 16 KHz sampling rate. The differencing procedure reduces the dynamic range of the input waveform and preemphasizes the high frequency. In the frequency domain, the effect of differentiation is multiplication by frequency which results in a six dB per octave "boost" for the high frequencies. This high frequency preemphasis is desirable because the amplitude of the speech signal decreases as a function of frequency. The differentiated acoustical signal is then clipped so that it fits into one byte.

The average amplitude, the mean, and the log of the mean squared amplitude of the differentiated and clipped output is then determined at 104, 105 for, in the illustrated embodiment, a "window" having 320 samples or twenty milliseconds of speech. The log used here is:

$$8 \log_2 (\text{amplitude}) - 128 \qquad \text{(Eq. 1)}$$

The result is then clipped to fit into a single byte.

While the "window" used here is twenty milliseconds in duration, it is important to recognize that, according to the invention, the signal processing circuitry is intended to generate a new set of acoustic parameters (as described below) every ten milliseconds. Successive windows therefore overlap, by ten milliseconds in the illustrated embodiment.

Next, the differentiated and clipped data of the twenty millisecond window is normalized at 106 by subtracting therefrom the mean amplitude over the "window". This is in effect equivalent to subtracting the zero frequency component, or DC level, of the signal. The normalized data is clipped again to fit within a single byte.

The normalized output from block 106 is then "windowed" at 108. Windowing is multiplication of the input array by a vector of window constants at 109 which has the effect of attenuating the data at both ends of the window. In the frenquency domain, the height of the side lobes is thereby reduced at the cost of increasing the width of the center lobe thus smoothing the resulting spectral estimate. While various types of windowing functions exist, each producting slightly different tradeoffs between side lobe height and center lobe width, the window chosen in the illustrated embodiment and which has been found to produce statistically better results is a sinc-Kaiser window which consists of multiplying the sinc function (sin ax)/ax, by a Kaiser function.

The Kaiser window is useful since it parameterizes the trade-off between side lobe height and center lobe width. Multiplying by the sine function gives a bandwidth at each frequency in the Fourier transform. In the illustrated embodiment, a bandwidth of 355 hertz is used. In the Kaiser function window, the beta parameter, B, is set at 5.2.

The Kaiser function, which is described for example in "Digital Filters", chapter 7 of *System Analysis by Digital Computer*, Kuo and Kaiser, John Wiley & Sons, New York, 1966, is given by $$K(n) = \frac{I_0(B((n/((N-1)/2))^2 + 2(n/((N-1)/2)))^{\frac{1}{2}})}{I_0(B)} \qquad \text{(Eq. 2)}$$

where $I_0$ is a modified zeroth order Bessel function of the first kind:

$$I_0(Z) = \frac{1}{\pi} \int_0^\pi \cosh(Z \cos \theta) d\theta. \qquad \text{(Eq. 2a)}$$

The sinc function for the parameters of the illustrated embodiment is:

$$\frac{\sin (a (n - (N-1)/2))}{a (n - (N-1)/2)} \qquad \text{(Eq. 3)}$$

($n = 0, 1, \ldots, N - 1$) and $N = 320$ points in the window where $a = \frac{2\pi (355/2)}{16000} = .0697$ The waveform is windowed after normalization (rather than before normalization) since otherwise the mean would introduce an extra rectangular signal which would increase the side lobes. The windowed waveform is block normalized so that its samples fit in thirteen bits. This is so that accumulation performed during folding, as described below, does not overflow sixteen bits.

The discrete Fourier transform of the windowed data is now performed at 112. While there are many ways of efficiently performing a Fourier transform, in order to reduce the number of multiplications and hence the time to effect the Fourier transform computation, a folding technique at 113 making use of the symmetries of the sine and cosine, by converting the data vector into four smaller vectors, is performed. Since the sampling of values in the freqeuncy domain is done at multiples of a base frequency, each of the resulting vectors will have a length of ¼ the period of the base or fundamental frequency, also called the base period.

In the illustrated embodiment, the base frequency from a 16 kilohertz sampling rate and a 20 millisecond window is chosen to be 125 hertz. (The corresponding base period is 128 samples.) This represents the minimum chosen spacing between spectral frequency samples. As noted above, a 20 millisecond window encompasses two 10 millisecond frames of the incoming acoustic (and digitized) signal. Successive "windows" thus have an overlapping character and each sample contributes in two windows.

According to the folding technique, frequencies are divided into odd multiples and even multiples of the base frequency. The real (multiplication by the cosine) and the imaginary (multiplication by the sine) components of the transform will each use one of the resulting folded vectors for both classes of frequency.

The folding operation is performed in three steps. First, the elements which are offset by the base period are grouped together. In the illustrated embodiment, using a base frequency of 125 hertz at a sampling rate of 16 kilohertz, this results in 128 points. This "fold" is a direct consequence of the expression for the Fourier transform:

$$F(nf) = \sum_k x(k) e^{(-2\pi j n k f)} \qquad \text{(Eq. 4)}$$

where f is the base frequency (125 hz) and the sum is extended from k=0 through the number of the samples in the window (less 1). Since $$e^{(ja)} = e^{j(a=2\pi)}, \qquad \text{(Eq. 5)}$$

the transformation can be rewritten as:

$$F(nf) = \sum_k x_1(k) e^{(-2\pi j n f k)} \qquad \text{(Eq. 6)}$$

where the sum is extended from k=0 through k=4Q−1 and Q is equal to ¼ of the base period and $x_1(k)$ is the sum of $x(k)+x(k+4q)+x(k+8q)+ \ldots$ The second fold operation is performed by rewriting the last expression (Equation 6) as:

$$F(nf) = \sum_k x_1(k) (\cos(2\pi nfk) + j \sin(2\pi nfk)). \qquad \text{(Eq. 7)}$$

We can then use the symmetries of the sine and cosine functions since $\sin(a) = -\sin(2\pi - a)$ and $\cos(a) = \cos(2\pi - a)$, the tranform of Equation 7 can be rewritten as:

$$F(nf) = \sum_k x_{2c} \cos(2\pi nfk) + j x_{2s} \sin(2\pi nfk) \qquad \text{(Eq. 8)}$$

where $x_{2c} = x_1(k) + x_1(4Q-1-k)$ and $x_{2s} = x_1(k) - x_1(4Q-1-k)$.

The sum extends from k=0 to k=2Q−1. Thus there are 64 terms where the sampling rate is 16 kilohertz and the base frequency is 125 hertz.

The third step of the procedure resolves the instance of odd multiples of the base frequency. The symmetries $\sin(a) = \sin(\pi - a)$ and $\cos(a) = -\cos(\pi - a)$ allow the transformation of Equation 8 to be rewritten as:

$$F(nf) = \sum_k x_{3CO} \cos(2\pi nfk) + j x_{3SO} \sin(2\pi nfk) \qquad \text{(Eq. 9)}$$

where $x_{3CO} = x_2 \cos(k) - x_2 \cos(2Q-1-k)$ and $x_{3SO} = x_2 \sin(k) + x_2 \sin(2Q-1-k)$.

For even multiples of the base frequency the equations are:

$$F(nf) = \sum_k x_{3CE} \cos(2\pi nfk) + j x_{3SE} \sin(2\pi nfk) \qquad \text{(Eq. 10)}$$

where $x_{3CE} = x_2 \cos(k) + x_2 \cos(2Q-1-k)$ and $x_{3SE} = x_2 \sin(k) - x_2 \sin(2Q-1-k)$.

This procedure uses the equalities of $\sin(a) = -\sin(2\pi - a)$ and $\cos(a) = \cos(2\pi - a)$. The sums, after the third procedure or third fold, now extend from zero to k=Q−1. That is, 32 terms for a sampling rate of 16 kilohertz and a base frequency of 125 hertz. After the three folds, the vectors are block normalized to six bits.

At this point the discrete Fourier transform is completed by multiplying the data from the folding procedure by a matrix of sines and cosines (113a). By calculating the multiples of the base frequency, modulo 2, the set of folds which are needed to be used can be determined. The resulting vectors are block normalized to fit within a single byte. The result of the Fourier analysis is two vectors of signed integers, the integers ranging from −128 to 127 (that is, one byte), one of the vectors containing the real terms of the Fourier analysis and the other containing the imaginary terms of the analysis. The length of the vectors is equal to the number of frequencies employed during the recognition process. In the illustrated embodiment the number of frequencies is thirty-one and are:

| | | | |
|---|---|---|---|
| 250 | 1250 | 2250 | 3250 |
| 375 | 1375 | 2375 | 3500 |
| 500 | 1500 | 2500 | 3750 |
| 625 | 1625 | 2625 | 4000 |
| 750 | 1750 | 2750 | 4500 |
| 875 | 1875 | 2875 | 5000 |
| 1000 | 2000 | 3000 | 5500 |
| 1125 | 2125 | 3125 | |

The next step, at 114, is to determine the sum of the squares of the real and imaginary parts of the spectrum at each multiple of the base frequency. The result is divided by two, that is, shifted down one bit, so that the square root which is computed at 116 will fit into one byte.

After the square root is taken at 116, the resulting spectrum is transformed, at 118, according to the equation:

$$f(x) = 128(x - \text{mean})/(x + \text{mean}). \quad \text{(Eq. 11)}$$

This function, often called the "quasi-log" and described in more detail in U.S. Pat. No. 4,038,505, the disclosure of which is incorporated herein by reference, enhances the speech recognition properties of the data by redistributing the dynamic range of the signal. The "mean" is the average value of the array of spectral values.

The result of the quasi-log is a vector having, in the illustrated embodiment, thirty-one acoustical parameters. Added to this vector, at 120, is the mean amplitude value of the input signal calculated at 104 and 105. This amplitude value and the 31 element vector resulting from the quasi-log step at 118 are applied to a principal component transformation at 122. The principal component transformation reduces the number of elements in the vector array to provide a smaller number of acoustical parameters to compare against the speech representing reference template patterns prestored in the apparatus. This reduces both computational cost and memory cost.

The principal component transformation, at 122, is performed in three parts. In the first step, a speaker independent mean for each element of the vector is subtracted from the respective element in the vector. Second, the result of the first step is multiplied by a speaker independent matrix which is formed as described below. Finally, each element of the resulting vector from the second step is individually shifted by an element dependent amount and then is clipped to fit within an eight bit byte (see 123). This essentially means that the distribution of each component of the vector has been normalized so that the byte will contain three standard deviations around the mean of the component. The output of the principal component analysis, an array of bytes having a vector length equal to a selected number of components, is the acoustic parameter output of the signal processing section 26 of the apparatus of FIG. 1 and is applied to the bus 24 for further processing as described in more detail below.

The principal component analysis is employed to reduce the number of acoustic parameters used in the pattern recognition which follows. Principal component analysis is a common element of many pattern recognition systems and is described in terms of an eigenvector analysis, for example in U.S. Pat. No. 4,227,177, assigned to the assignee of this invention. The concept of the analysis is to generate a set of principal components which are a normalized linear combination of the original parameters and where the recombination is effected to provide components with maximum information while maintaining independence from each other. Thus, typically, the first principal component is the normalized linear combination of parameters with the highest variance. The concept is that the direction containing the most variation also contains the most information as to which class of speech a vector belongs to.

Normally, the vectors containing the linear combinations under consideration are constrained to be of unit length. This would be the best procedure if all recombined parameters had the same variation within the defined speech classes, but unfortunately they do not. The prior art analysis method is therefore modified to normalize all linear combinations of parameters to have the same average, within class, variance and the first principal component is chosen to be that normalized linear combination with the highest across class variance.

The principal component analysis is derived as follows. Let $M'$ represent the transpose of a matrix $M$. Let $T$ be the covariance matrix of some set of $P$ original parameters. Let $W$ be the average within class covariance matrix. Let $V$ be a $P$ dimensional vector of coefficients, and let $X$ be a $P$ dimensional vector of acoustic parameters. For simplicity of derivation, assume that the original parameter vector $X$ has a zero mean. In practice, in the illustrated embodiment, the assumption is implemented by subtracting from the original parameters, their respective mean values. The variance of a linear combination of parameters $V'X$, is $$\text{Expectation of } [(V'X)(V'X)'] = V'(XX')V = V'TV$$

since $T$ is defined as the expectation of $XX'$. Similarly, if $W(i)$ is the covariance of the ith class of parameters, then $V'W(i)V$ is the covariance of the parameter $V'X$ in the ith class. The average within class variance is then $$1/N \sum_{i=1}^{N} V'W(i)V, \quad \text{(Eq. 13)}$$

where $N$ is the number of classes. By the distributive property of matrix multiplication, this is just equal to $V'WV$. This definition weights all classes equally, independent of the number of samples contained in each class. Actually, in the illustrated embodiment, all samples were weighted equally on the assumption that it is more important to discriminate between classes that occur frequently.

Next $(V'TV)$ is maximized under the constraint:

$$V'WV = 1 \quad \text{(Eq. 14)}$$

This problem can be solved by using Lagrange multipliers. Let the one Lagrange multiplier be denoted by y. We then want to solve (Eq. 14) and (Eq. 17) (below)

$$f = (V'TV) - y(V'WV - 1) \quad \text{(Eq. 15)}$$

$$0 = df/dV = 2TV - 2yWV \quad \text{(Eq. 16)}$$

$$TV = yWV \quad \text{(Eq. 17)}$$

This equation (17) is just the general eigenvector problem and is solved by P eigenvectors with real eigenvalues, due to the symmetry of T and W.

The solution which maximizes the original criteria is given by the eigenvector V with the largest eigenvalue y. This can be seen by observing that the variance of VX is given by $$V'TV = V'yWV = yV'WV = y \cdot 1 = y \quad \text{(Eq. 18)}$$

Let the solution to (Eq. 17) with the largest eigenvalue be $V_1$, and the corresponding eigenvalue be $y_1$. For the next parameter, solve for the linear combination of parameters V'X which maximizes (V'TV), which has unity within class variance, (V'WV=1), and which is uncorrelated with $V_1'X$. The condition that V'X is uncorrelated with $V_1'X$ allows the analysis to find the linear combination of parameters which has maximum across-class variance compared to within class variance, but which does not include information already available from the first component. By the definition of uncorrelated, we have: (Eq. 19)

Expectation of [(V'X)
$$(V_1'X)'] = V'(XX')V_1 = V'TV_1 = 0 \quad \text{(Eq. 19)}$$

Let y and z be Lagrange multipliers, and solve (Equations 14, 19 and 21):

$$g = (V'TV) - y(V'WV - 1) - z(2V'TV_1) \quad \text{(Eq. 20)}$$

$$0 = dg/dV = 2TV - 2yWV - 2zTV_1 \quad \text{(Eq. 21)}$$

Multiplying through on the left by $V_1$ and dividing by 2:

$$0 = V_1'TV - yV_1'WV - zV_1'TV_1 \quad \text{(Eq. 22)}$$

Substituting $V_1'TV = 0$ as a constraint; and $WV_1 = TV_1/Y_1$ from (Eq. 18) in these relations; and multiplying through by −1;

$$0 = (y/y_1)(V_1'TV) + zy_1V_1'WV_1 \quad \text{(Eq. 23)}$$

$$0 = (zy_1)(1) = zy_1 \text{ or} \quad \text{(Eq. 24)}$$

$$z = 0 \quad \text{(Eq. 25)}$$

Therefore, given $V_1$, the following three equations can be solved:

$$TV = yWV \quad \text{(Eq. 26)}$$

$$V'WV = 1 \quad \text{(Eq. 27)}$$

$$V'TV_1 = 0 \quad \text{(Eq. 28)}$$

Any vector Q which satisfies (Eq. 26) can be turned into a vector which satisfies both (Eq. 26 and 27) by dividing Q by the scalar Q'WQ.

Consider any two vectors, Q and R, satisfying Eq. 20, with corresponding eigenvalues q and r. Then $$rQ'WR = Q'TR = R'TQ = qR'WQ = qQ'WR \quad \text{(Eq. 29)}$$

$$(r-q)Q'WR = 0 \quad \text{(Eq. 30)}$$

If r is not equal to q then $$0 = Q'WR = Q'TR/r \quad \text{(Eq. 31)}$$

$$Q'TR = 0 \quad \text{(Eq. 32)}$$

If (Eq. 26) is satisfied by two vectors with different nonzero eigenvalues, then those two vectors also satisfy (Eq. 28), and are therefore uncorrelated.

The second component is thus chosen to be the vector $V_2$ which satisfies (Eq. 26 and 27) and which has the second largest eigenvalue, assuming the two largest are distinct. Correspondingly, the nth component $V_n$ can be made uncorrelated with $V_1$ through $V_{n-1}$ and the same procedure can be employed to show that $V_n$ must only satisfy (Eq. 26 and 27), so long as there are n distinct nonzero eigenvalues.

In this manner, assuming that the characteristic polynomial corresponding to (Eq. 26) has N distinct nonzero roots, a sequence of N linear combinations of parameters, each one maximizing the ratio (V'TV)/(V'WV), while constrained to be uncorrelated with the previous linear combinations in the sequence, can be determined. This sequence comprises the N generalized principal components.

In the method described above, the linear combinations of parameters that maximize V'TV while holding V'WV constant are found. Since, as can be easily shown, T=W+B, (B is the "average between-class variance"), the same results can be obtained by maximizing V'BV while holding V'WV constant. Since B can be expressed as the sum of terms involving differences between pattern means, intuitively, by maximizing V'BV, the pattern means are being moved apart from each other. It may be that in speech recognition it is more important to distinguish between some patterns than between others. If the differences between pattern means in the formulation of B are weighted by different amounts, the resultant principal components will be biased to differentiate more between some patterns than others. One instance for assigning different weights to different pattern pairs is when data and patterns from different speakers are used in the principal components analysis. In such a case it is not worthwhile to try to separate patterns from different speakers, and all such pattern pairs should receive the weight of zero.

The creation of the principle component matrix takes place prior to the real time speech recognition process. Typically, a large data base is required to obtain a good estimate of the matrix.

The output of the principal component transformation is the acoustic parameter vector. A new "vector" or set of acoustic parameters is made available each frame time, that is, each ten milliseconds in the illustrated embodiment. The acoustic parameters are available on bus 24 from the signal processing circuitry 26. Since each frame time has a window representing twenty milliseconds of input audio, there is as noted above, an overlap in the information represented by the acoustic parameter data. The acoustic parameter data is stored in the memory buffer 34. As noted above, and under the control of the process controller 32, this allows a variable rate data processing by circuitries 28 and 30. This is important in order to allow the entire apparatus to meet the average real time requirements of analyzing the incoming speech, but not to require it to maintain real time processing throughout each speech element on a frame by frame basis.

On a frame by frame basis, the maximum template matching and dynamic programming data processing requirements generally occur toward the middle of a speech unit, for example a word. Correspondingly, the processing requirements at the beginning or end of the speech unit are generally substantially less, in fact, less than the capability of the described apparatus. Thus, the use of buffer 34 to store acoustic data in combination with the capabilities of the circuitries 28 and 30, allow the average processing rate of the apparatus to be greater than that required for real time operation. Thus real time operation is achieved without requiring the hardware to meet instantaneous peak processing rates.

Likelihood Computations

The purpose of the likelihood computation is to obtain a measure of the similarity between the input acoustic parameters from the principal component transformation and the template patterns which are employed for describing the elements of speech to be recognized. In the illustrated embodiment, each speech element, is described by a sequence of template patterns. Associated with each template pattern is a minimum and a maximum duration. The combination of the template pattern and the minimum and maximum durations is an acoustic kernel. Typically the speech element is a spoken word although the speech element can also be a combination of words, a single phoneme, or any other speech unit.

In accordance with the present invention, the chosen measure of comparison is a monotonic function of the probability of a particular speech template given the observation of acoustic parameters at a given frame time. The acoustic parameters can be thought of as the observation of a random variable. The random variables which model the acoustical parameters have a probability distribution given by the pure unit of sound intended by the speaker. Since the sound which is received is not "pure" and for ease of computation, the probability distribution which is chosen is the Laplace, or double exponential, distribution. The Laplace distribution is written as, for a single random variable, $$f(x) = c e^{-|x-u|b} \qquad \text{(Eq. 33)}$$

where u is the mean of the distribution, b is inversely proportional to the standard deviation, and c is such that the density integrates to one. In order to make the computation easier, the logarithm of the likelihood rather than the likelihood itself is chosen as the measure to be employed. (This allows addition rather than multiplication to be employed in calculating probabilities.) This can be accomplished since the logarithm is a monotonic function of its argument. Therefore the measure can be rewritten as:

$$\ln f(x) = \ln(c) - |x-u|b. \qquad \text{(Eq. 34)}$$

In this computation only u and b need to be known since the natural log of c is determined by the condition that the density must integrate to one. In order to keep most numbers positive, the opposite or negative of this measure is employed. The acoustic parameters for a given frame are assumed to be independent so that the final expression for the measure of likelihood probability becomes $$\text{Cost} = K + \sum_i |x(i) - u(i)| \, b(i) \qquad \text{(Eq. 35)}$$

where the sum extends over all acoustic parameters, and K is a function of the b(i).

In the illustrated embodiment, the likelihood computation is generated for a template pattern "on demand" for use by the dynamic programming portion of the apparatus. Where, as here, there are two circuitries 28 and 30 operating in parallel, it is possible that the dynamic programming portion of circuitry 28 or 30 requires a likelihood score from the other circuitry 30 or 28. This would require the transmission of data over bus 24. The dynamic programming "division of labor" according to the grammar level and word level "graphs" described below is chosen to minimize this requirement for the transmission of data on bus 24.

The input to the likelihood calculation, as noted above, consists of the acoustic parameters at a frame time and the statistics (u and b above) describing the template pattern. The template pattern statistics consist of a mean ($u_i$) and a "weight" ($b_i$) for each acoustic parameter, and a logarithmic term (corresponding to K). In the template pattern statistics creation, the logarithmic term usually has been shifted to the right (divided by a power of 2) by a quantity which is selected to keep the magnitude of the cost within a sixteen bit integer. For each acoustic parameter, the absolute value of the difference between the acoustic parameter and the mean is determined and that quantity is multiplied by the weight associated with the parameters. These quantities are added for all of the acoustic patterns; and the sum, if it is less than the maximum sixteen-bit quantity, is shifted to the right by the same quantity applied to the logarithmic term so that the logarithmic term can then be added thereto. The result is the "likelihood" or "cost" for the template pattern at that frame time.

The Dynamic Programming Approach

A dynamic programming approach to speech recognition has been used and described elsewhere, for example, in U.S. patent applications Ser. Nos. 308,891, 309,208, and 309,209, assigned to the assignee of this invention and incorporated herein by reference. The dynamic programming approach used herein is an improvement upon the dynamic programming approach described in these U.S. patent applications.

Figure 10:
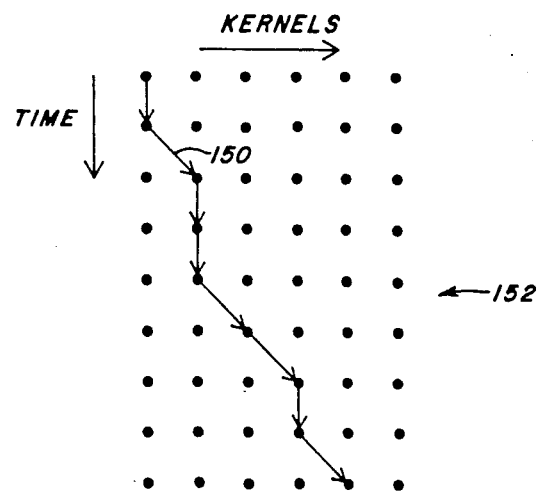
FIG. 10 is a diagrammatic lattice presentation of the dynamic programming approach.

Referring to FIG. 10, the dynamic programming approach can be thought of as finding the best path 150 (that is, the path with the minimum score) through a matrix 152 in which the rows are indexed by time in discrete intervals (corresponding to the discrete time intervals for which measurements are made) and the columns represent elementary units of speech (acoustic kernels in the illustrated embodiment). In theory, it is possible to try all possible paths through the matrix and choose the best one. However, there are far too many paths to consider each time and hence in order to find a computationally efficient method and apparatus for finding the best path through the matrix, a Markov model for the speech is considered. A stochastic process is said to be Markovian, if the probability of choosing any given state at a time t+1 depends only upon the state of the system at time t, and not upon the way in which that state, at time t, was reached.

In speech, there is coarticulation, the state by which a given elementary unit of speech affects both those units which are spoken before it and after it. (Units of speech have an effect upon the past tecause a speaker anticipates what he is going to say.) In order to work around the coarticulation problem within a word, the template patterns are formed for the coarticulated speech units. This method makes it very difficult to share templates between words which theoretically have the same speech units and is why, in the illustrated embodiment of the invention, the apparatus does not attempt to share such templates. For the purposes of the illustrated embodiment, coarticulation between words is ignored.

Thus, the Markovian model for speech is built by including within each state all the information relevant to future decisions. Thus the units of speech are grouped into words because ultimately it is words which will be recognized and it is at the word level that syntactical constraints can and, in the illustrated embodiment, must be applied. Syntactical constraints are represented by a grammar graph 158 (FIG. 5) and it is the grammar graph that makes the model Markovian. Therefore, when recognizing utterances, the state space through which the path must be found viewed as logically existing at two levels, the grammar or syntax level, and the word level at which the elementary speech units exist.

At the grammar level the state space consists of a number of connected nodes. A node is a logical point in time which lies either between, before, or after individual words within an utterance. At each node there is a fixed legal vocabulary, each word (or words) of which connects the node to a new node. A grammar graph thus consists of a list of arcs, an arc having a starting node, an ending node, and a list of words which cause the transition therebetween (see FIG. 5). (For "self" arcs, the starting and ending nodes are the same.)

The second level mentioned above employs word models. A word model is a finite state representation of a particular word as spoken by a particular speaker. In accordance with the illustrated embodiment, the word model employed is a linear sequence of acoustic "kernels". A noted above, an acoustic kernel is a single acoustic template pattern having a minimum and a maximum duration. In the illustrated embodiment, a word thus consists of a sequence of sounds (each represented by a template pattern), with a minimum and maximum duration of time being associated with each sound. There is no provision for alternate pronunciations and in accordance with the preferred embodiment of the invention, the method is implemented for speaker dependent speech recognition. Thus, the method relies upon the best estimate that the same speaker says the same word in roughly the same way at all times.

Figure 6:
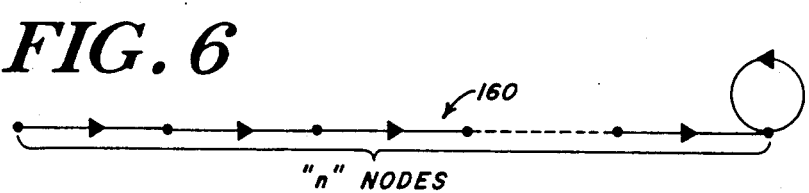
FIG. 6 is a schematic representation of a dynamic programming word graph according to the invention.

In a graph form, referring the FIG. 6, each word model acoustic kernel has a minimum duration of "n" samples and is represented by n identical nodes 160. These are different from the grammar nodes mentioned above. The "n" nodes are strung together in a series, each node having a single arc coming into and a single arc leaving it. The maximum duration, that is, a duration greater than the minimum duration, can be represented by a last node having an arc coming in, an arc leaving, and a self loop which is the optional dwell time, that is, the difference between the minimum and maximum durations. All of the arcs have the same acoustic template pattern associated therewith, and for the self loop, a count of the number of times through the loop must be kept in order to accurately maintain all of the information (which is needed later during traceback).

Figure 5:
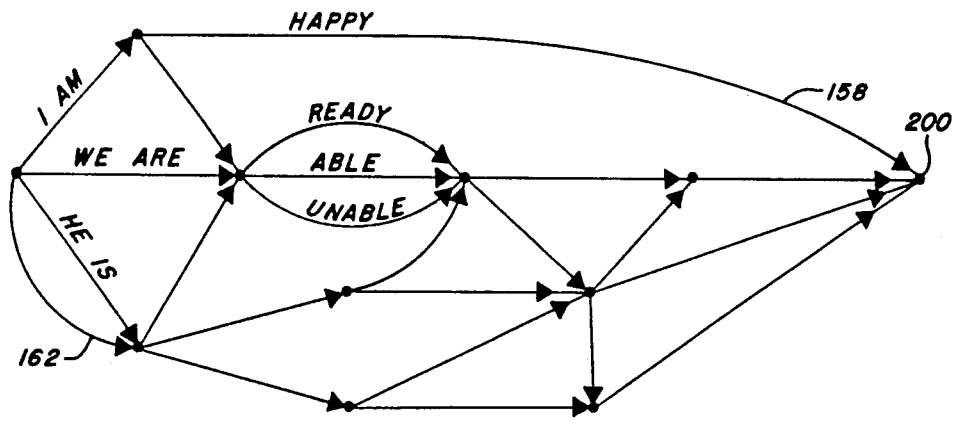
FIG. 5 is a schematic representation of a dynamic programming grammar graph according to the invention.

The word model graph and the grammar model graph are integrated by replacing, in the grammar graph, each arc with the corresponding word models. The connection between the grammar nodes and the word nodes is made by what are called "null arcs". Null arcs also allow the apparatus to skip over optional words in the grammar, for example arc 162 (FIG. 5).

Once the needed likelihood computations are available, the method proceeds to recognize speech using those likelihood statistics and the allowable syntax graph of the incoming speech. Pictorially then, the graph of the utterance is first transformed into a lattice, within a matrix, as follows. (see, e.g., FIG. 10) Each state or node of the graph corresponds to a column of the lattice and each row of the lattice corresponds to a specific frame time. Thus, a lattice state in row I corresponds to time I and a lattice state in row J corresponds to a time J. Thus, traversing the lattice between row I and row J corresponds to obtaining the acoustic parameters for the times between and including times I+1 and J while traversing, in the "graph", the arc(s) whose origin node corresponds to the original column and whose ending node corresponds to the destination column. Imposing minimum and maximum durations upon the template patterns corresponds to restricting the vertical distance that the lattice arcs can span (between two columns).

The main thrust of the dynamic programming employed in the present invention is, at each row (or time) in the lattice, find the optimal path to a destination lattice state using the previously computed costs of the states in the rows between the destination row and the starting row. The "optimal or best path" is equivalent to minimizing the cumulative likelihood score by choosing the template pattern which maximizes the conditional probability that the speech unit corresponding to the template is the correct one given the acoustic parameters at the frame time. That conditional probability is maximized over all of the "active" templates ("active" templates are defined below.

More specifially, the dynamic programming performs the following steps at each frame time:

(1) All nodes are initially set to an initial maximum (16 bit) likelihood score.
(2) Destination nodes of null arcs can inherit their score from the source node of the arc in zero time.
(3) Each "active" kernel in a word on each grammar arc is processed using likelihood computations and duration information and a minimum score for the word at that frame time is determined.
(4) If the minimum score for the word is greater than some predetermined threshold, the word is deactivated to reduce computations with successive frames. This is effectively a method for reducing computation based on the expectation that this path will not be the optimum one.
(5) The cumulative likelihood score of paths at grammar nodes, that is, at the end of words leading to a grammar node, is computed.
(6) If not all of the kernels of a word are active, and the score of the last active kernel is less than some preselected activation threshold, the next kernel of the word is made active.
(7) If the score at the final grammar node of the graph, node 200 of FIG. 5, is better (i.e. less) than the score at any intermediate grammar node, then an end of utterance has been detected.

Considered in more detail, at the acoustic kernel level, the dynamic programming uses the "seed score" for the source node of the kernel, the cost of the acoustic kernel calculated from the current frame, and the global minimum score of the last frame, to arrive at the likelihood score of a particular kernel at a present frame time. As noted above, the particular hardware embodiment described herein determines the likelihood costs "on demand". Thus, as the likelihood costs are required by the kernel level dynamic programming for a particular frame time, the likelihood computation is generated. Each node corresponding to the kernel (recall, referring to FIG. 6, that the kernel is modeled by a plurality of nodes, one for each required frame time duration) can inherit as the "seed score" a likelihood score from a preceding node. (For the first node of a kernel, the "seed score", is inherited from the last node of a preceding kernel, unless the first kernel node is the first node along a grammar arc in which case, the "seed score" is inherited from the last node of the best score leading into the grammar node.) In addition, the last node having the kernel can inherit a score from itself (because of the use of the self loop in the word model) in which case the number of times that the self loop has been traversed must be recorded. In order to keep the accumulated costs as small as possible, all of the likelihood scores are normalized by subtracting the global minimum score (that is, the best score) of the last frame. The new score is then the sum of the inherited score plus the likelihood score or cost for that template at that frame time. When all of the "active" kernels have been processed, the minimum score for the word is determined and output to the corresponding grammar node.

If the minimum score for the word is greater than a selected deactivation threshold, all kernels of the word are made inactive except for the first one. This has the effect of reducing the required likelihood and dynamic programming computations at the risk of possibly discarding what might become an optimum path. On the other hand, it the score on the last node of the last active kernel of a word (where not all kernels are active) is less than an activation threshold, then the next kernel of the word is made active. If all of the kernels of the word are active, the destination node of the current grammar arc receives a score which is the minimum score of all the words on all the arcs leading into the grammar destination node.

The dynamic programming employed here is similar to that described in U.S. patent application Ser. No. 308,891 noted above and incorporated herein by reference. The primary difference between the dynamic programming employed here and that described in the earlier filed application, is the use here of the null arc and the activation/deactivation threshold. The use of the null arc in this "grammar" advantageously provides the ability to concatenate words which enables an easier implementation of the apparatus according to the invention. And, as noted above, the activation/deactivation thresholds reduce the computational demands on the apparatus.

In the preferred embodiment of the invention, a partial traceback is employed as a memory saving device. At each frame time, all nodes at a time in the past, equal to the present time minus the maximum duration of a word, are checked to see whether there is an arc leading from that node to any node at a later time. If there is not, these nodes are eliminated from the set of nodes which can be used in traceback. Recursively, all nodes in the further past that have arcs leading only to the deleted nodes are in turn deleted. There results therefore a pruned set of traceback nodes which enable less memory to be employed for the traceback process.

Once end-of-utterance has been detected, for example, when the final grammar node has a better (lower) score than any other grammer node of the apparatus, a "forced traceback" method is employed to determine, based upon the results of the dynamic programming over the length of the utterance, what was actually the best word sequence. The traceback starts at the final node of the grammar graph and progresses backwards, toward the beginning of the utterance, through the best path. The output of the traceback is the recognized utterance along with the start and end times, and if desired, a score for each word. Thus, the output of the least cost path search is the most probable utterance which is consistent with the specified grammar, the specified word models and templates, and the input acoustic parameters. Further, information necessary to train on the utterance is also available from the system as described below.

Training/Enrollment

The description presented thus far describes a method for recognizing speech using a plurality of previously formed template patterns. The formation of those template patterns is key to providing a speech recognition system which is both effective and reliable. Consequently, care and attention must be given to the creation of the template patterns. In particular, for the illustrated embodiment of the invention, the apparatus is designed to be speaker dependent and hence the template patterns are specifically biased toward the speaker whose speech will be recognized.

Two different methods are described hereinafter for adapting the apparatus to a specific speaker. In a first enrollment method, a zero-based enrollment, an initial set of template patterns corresponding to a new word is generated solely from an input set of acoustic parameters. The set of template patterns is created by linearly segmenting the incoming acoustic parameters and deriving the template patterns therefrom. The second method, a training procedure, makes use of a set of acoustic parameters derived from the speaker, and the recognition results (that is, speech statistics) of known or assumed utterances which provide an initial "rough cut" for the template patterns, to create better templates. This is accomplished by performing a recognition on each word within a known utterance and using a known word model.

Turning first to the zero-based enrollment technique, a number of acoustic kernels, each with a minimum and maximum duration, are set for the word based on the duration of the word. The beginning and end of the word are determined, as will be described below, and the frames of acoustic parameters are then proportionally assigned to each kernel (five frames per kernel). The template pattern statistics, the mean and variance, can then be calculated from the acoustic parameters. In the illustrated embodiment, zero-based enrollment employs, for example, ten acoustic kernels for a word (an average of 50 frames in duration), each having a minimum duration of two frames and a maximum duration of twelve frames. There results a set of statistics which can be employed for describing the utterance or which can be improved, for example as described below.

For the training method, the input data include not only the acoustic parameters for the spoken input word, but training data from a previous least cost path search. This data can include the tentative beginning and ending times for a word. If no thresholding is performed, and there are no dwell time constraints, the dynamic programming should give the same result as the grammar level dynamic programming. If the dynamic programming at the word level ended where expected, and traceback was performed within the word at the acoustic kernel level. the traceback information helps create better template patterns for the word. As a result, a better set of templates can be achieved. In the illustrated embodiment, a special grammar consisting of the word alone is built. All of the kernels in the word are made active and word level dynamic programming is performed.

For each word used in the training process, one of the most important aspects of effective training is properly setting the starting time and the ending time for the word. Several procedures have been employed. Once procedure employs a threshold value based upon the amplitudes of the incoming audio signal. Thus for example, a system can be designed to "listen" to one pass of the speech and to take the average of the five minimum sample values (the average minimum) and the average of the five maximum sample values (the average maximum) during that pass. Then, a threshold is set equal to the sum of four times the average minimum value plus the average maximum value, the entire sum being divided by five. The system then goes through the speech utterance again and after several (for example seven) frame times have amplitudes which exceed the threshold value, the word is declared to have begun at the first of the frames which exceeded the threshold value. Similarly, at the end of a word, the word is declared to have ended at the end of the last of several (for example seven) frames each of which exceeds the threshold value.

Figure 7:
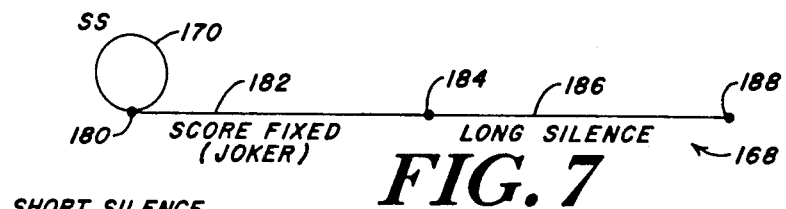
FIG. 7 is a schematic representation of a grammar using a single element joker word according to the invention.

A preferred approach however to determine the beginning and end of an utterance during enrollment is to use a threshold or "joker" word. This provides for noise immunity as well as an excellent method of determining the beginning and end of a speech utterance. Referring to FIG. 7, a grammar graph 158 employing the "joker" word, has a self loop 160 at a node 180, the self loop representing a short silence. The imaginary or joker word, represented by an arc 182 between nodes 180 and 184 has a fixed or constant likelihood cost per frame associated therewith. An arc 186 representing a long silence, leads from node 184 to a node 188. When silence is the input signal, that is, prior to the utterance being made, the self loop (short silence) has a good likelihood cost per frame and the grammar "stays" at node 180. When speech begins, the cost per frame for silence becomes very poor and the fixed cost of the "joker", along an arc 182, is good relative thereto and provides a path from node 180 to node 184. This is the beginning of speech. Therafter, the transition from node 184 to 188 denotes the end of speech.

Figure 8:
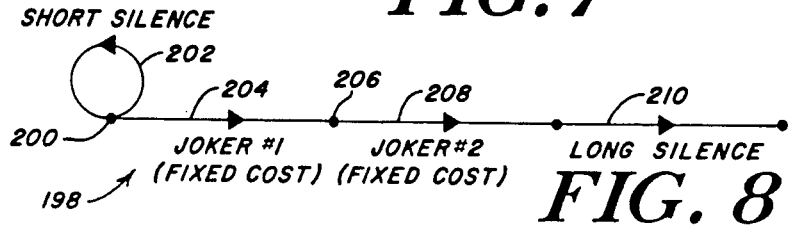
FIG. 8 is a schematic representation of a grammar using a double joker word according to the invention.

While the grammar graph of FIG. 7 works adequately, improved starting and ending times during training can be achieved using two "joker" words. Referring now to FIG. 8, a grammar graph 198 begins at a node 200, and so long as silence is received the grammar stays in a self loop 202 representing a short silence (which has a low cost), rather than proceeding along an arc 204 representing the first joker word. The first joker word is assigned a relatively high likelihood cost. When speech is encountered, the score for the short silence becomes poor, exceeds the score for the joker work (arc 204), and causes the grammar to traverse arc 204 to a node 206. At node 206, a second joker word 208 having a slightly lower likelihood cost than the first joker leads away from the node. When long silence is recognized, the grammar traverses arc 210. This indicates the end of the word. This method gives relatively good noise immunity (because of the added "hysteresis" effect of the two joker words) and accurately determines the beginning and end of the incoming isolated utterance employed during the training. The two different likelihood costs per frame assigned to the different "joker" words have the effect of making sure a word is really detected (by initially favoring silence); and then, once a word is detected, the word is favored (by the second joker) to make sure silence is really detected to end the word.

The parameters employed in the illustrated embodiment, in connection with the grammar of FIG. 8 are:

|  | First Joker | Second Joker | Short Silence | Long Silence |
| --- | --- | --- | --- | --- |
| Min. Dwell Time | 12 | 1 | 1 | 35 |
| Max. Dwell Time | 112 | 101 | 51 | 55 |
| Likelihood Cost (Typical) | 1900 | 1800 | — | — |

Figure 8A:
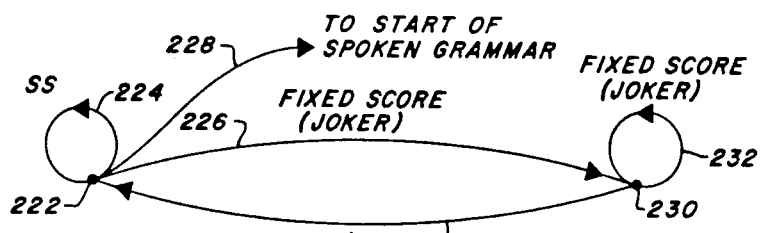
FIG. 8a is a schematic representation of a grammar using a double joker word as a "prelude" to speech recognition.

Referring to FIG. 8a, the joker word can also be employed to provide immunity to sounds such as coughs during "normal" speech recognition. In this respect, it is a "prelude" to normal recognition. In accordance with that aspect of the use of the joker word, a grammar graph 220 has a starting node 222; and so long as silence is received, the grammar stays in a self loop 224 representing short silence (which has a low cost) rather than proceeding either along an arc 226 representing a first joker word or an arc 228 leading to the start of the spoken grammar. When speech is encountered, the likelihood cost for the first joker word is relatively high, and a transition occurs along the arc 228 into the spoken grammar graph.

If however, "non-speech", such as a cough, occurs, it is the value of the first joker word which provides a likelihood cost that causes the grammar to traverse arc 226 to a node 230. The grammar stays at node 230, held there by a second joker word on a self arc 232, until a long silence is recognized. The long silence allows the grammar to traverse an arc 234 back to starting node 222. In this manner, the machine returns to its quiescent state awaiting a speech input and effectively "ignores" noise inputs as noted above.

System Structure

Figure 4:
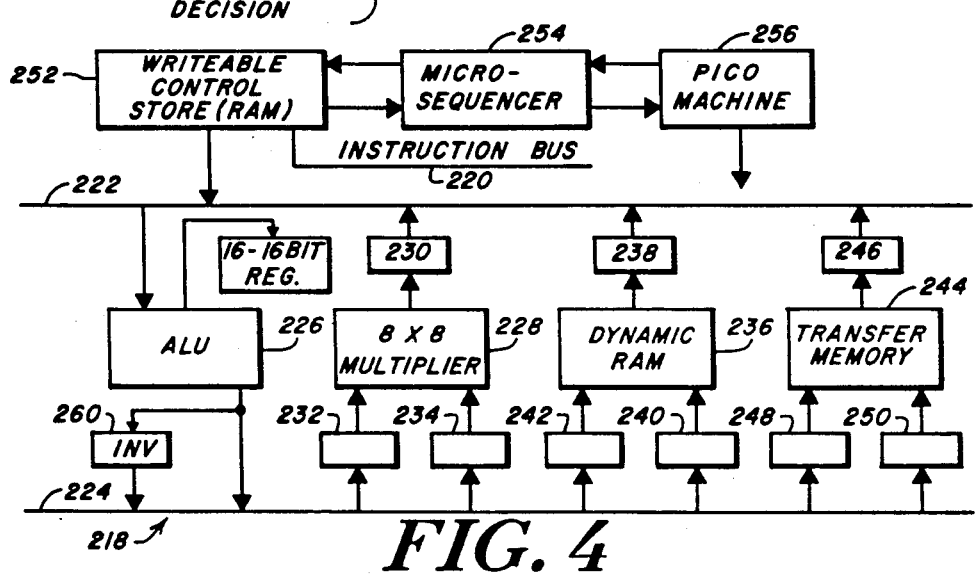
FIG. 4 is a more detailed schematic block diagram of the uniform processing circuitry portion according to the invention.

Referring now to FIG. 4, according to the preferred embodiment of the invention, the hardware configuration of FIG. 1 employs three identical circuit boards; that is, the signal processing circuit board corresponding to circuit 26, a template matching and dynamic programming circuit board corresponding to circuit 28 and a second template matching and dynamic programming board corresponding to circuit 30. Each board has the same configuration, the configuration being illustrated as circuitry 218 in FIG. 4. The circuitry 218 has three buses, an instruction bus 220, a first internal data bus 222, and a second internal data bus 224. Connected between data buses 222 and 224 are an arithmetic logic unit (ALU) 226, a fast 8 bit-by-8 bit multiplier circuit 228 having associated therewith an accumulator 230 and latching circuits 232 and 234, a dynamic random access memory (RAM) 236 for example having 128,000 words of sixteen bit memory with latching circuits 238, 240, and 242, and a fast transfer memory 244, for example having 2,000 words of sixteen bit memory and associated latches 246, 248, and 250. A writable control store 252 effects control over the operation of the storage and arithmetic elements. The control store 252 is a random access memory having an output to bus 222 and providing instruction data on bus 220. The writable control store, which may be for example a 4K by 64 bit RAM, stores the program instructions and is controlled and addressed by a microsequencer 254, for example an AMD 2910 microsequencer. A pico machine 256 is provided for clock timing, dynamic RAM refresh, and other timing functions as is well known in the art.

This structure employs a double pipelined method which enables the use of relatively inexpensive static RAM for the control store 252.

Important to fast operation for implementing the Laplace transformation to perform likelihood cost generation, an inverting register 260 is provided for converting the output of the arithmetic logic unit 226 to a twos complement output when necessary. The output of the inverting register is applied to the bus 224.

The operation and programming of the boards 26, 28, and 30, is controlled by the particular program code, which programming enables the board when employed as a signal processor 26 to provide the acoustic parameters necessary to perform the template matching and dynamic programming. Similarly, the programming of circuitry 28 and 30 enables the acoustic parameters to be properly processed for generating likelihood costs and for implementing the dynamic programming.

In operation, as noted above, the template matching and dynamic programming circuits 28 and 30 perform the likelihood cost calculations on demand, as required by the dynamic programming method. This can be accomplished for two reasons. First, the template pattern data necessary to perform all of the likelihood calculations needed by the dynamic programming portion of a board will be found on that board. (This is a result of the highly structured grammar graph and the restriction that templates are not shared between words.) Second board, for example board 28, receives the necessary likelihood scores it lacks to complete the dynamic programming for the board. The processor control 32 orchestrates this transfer of information.

The grammar graph referred to above and described in connection with FIG. 5, is stored in memories 236 and 244. Because it is stored in a highly structured manner, the data representing one grammar graph can be replaced with the data representing a second grammar graph making the equipment flexible for recognizing different syntax combinations of words or entirely new speech vocabularies (in which case training on the new vocabulary words would have to be done). In the illustrated embodiment, the data replacement is preferably performed by storing multiple grammars in memories 236 and 244 and selecting one of the grammars under program control. In the illustrated embodiment, the process control 32 can include a disk memory for storing additional grammars.

In addition as noted above, the microprocessor buffer 34 provides the capability of performing variable rate processing. Thus, the dynamic programming and likelihood score generation can fall behind real time somewhat, in the middle of a speech utterance where the greatest computational requirement occurs, catching up toward the end of the utterance where fewer calculations need to be made. In this manner, the entire system need not respond as noted above to the peak calculation requirements for real time speech recognition, but need only respond to the average requirements in order to effect real time recognition in the speaker dependent environment illustrated herein.

Other embodiments of the invention, including additions, subtractions, deletions, and other modifications of the preferred described embodiment will be apparent to those skilled in the art and are within the scope of the following claims.

What is claimed is:

1. In a speech recognition apparatus wherein speech units are each characterized by a sequence of template patterns, and having
    means for processing a speech input signal for repetitively deriving therefrom, at a frame repetition rate, a plurality of speech recognition acoustic parameters, and
    means responsive to said acoustic parameters
        for generating likelihood costs between said acoustic parameters and said speech template patterns, and
        for processing said likelihood costs for determining the speech units in said speech input signal,
    a method for inhibiting a response to nonvocabulary utterances in a speech input for which template patterns have not been created, comprising the steps of
    repeatedly, at a frame repetition rate, generating acoustic parameters representing said speech input,
    generating likelihood costs at each frame time for said acoustic parameters and said template patterns, said template patterns including a pattern representing silence,
    beginning a normal speech recognition process whenever said cost for an active template pattern is better than a predetermined threshold value, and
    reverting to a non-speech recognition process whenever said cost of said template patterns, including silence, is worse than said predetermined threshold value.

2. The method of claim 1 further comprising the steps of
    setting a second threshold value and
    remaining in said non-speech recognition process until a likelihood cost of said silence template in better than said second threshold.

3. The method of claim 2 further wherein there are two silence template patterns, a first short silence pattern employed during said reverting step, and a second long silence pattern employed during said remaining step.

4. In a speech recognition apparatus wherein speech units are each characterized by a sequence of template patterns, and having
    means for processing a speech input signal for repetitively deriving therefrom, at a frame repetition rate, a plurality of speech recognition acoustic parameters, and
    means responsive to said acoustic parameters
        for generating likelihood costs between said acoustic parameters and said speech template patterns, and
        for processing said likelihood costs for determining the speech units in said speech input signal,
    a method for inhibiting a response to nonvocabulary utterances in a speech input for which template patterns have not been created, comprising the steps of
    repeatedly, at a frame repetition rate, generating acoustic parameters representng said speech input,
    generating likelihood costs at each frame time for said acoutic parameters and said template patterns, said template patterns including a pattern representing silence,
    employing dynamic programming and a grammar graph for determining in response to said likelihood costs whether there has been a nonvocabulary utterance, said grammar graph having a normal speech recognition branch and a non-speech recognition branch, said non-speech recognition branch corresponding to nonvocabulary utterances for which said template patterns have not been created, and
    said employing step determining and selecting, using said dynamic programming, the better scoring of said speech recognition and said non-speech recognition branches.

5. The method of claim 4 further comprising the steps of
    assigning a fixed predetermined threshold score to an entrance arc of said non-speech recognition branch of said grammar,
    assigning a second fixed predetermined threshold score to a self loop are of said non-recognition branch for providing a path to remain in said non-recognition branch, and
    providing a silence arc leading from said self loop arc to the beginning of said entrance arc.

6. The method of claim 5 further comprising the step of
    assigning a self loop silence arc at a grammar node from which said entrance arc originates.

7. The method of claim 6 further comprising the steps of
    providing said silence arc with a good score for a long silence, and
    providing said self loop silence arc with a good score for a short silence.

* * * * *